July 26, 1960 G. J. PICHA ET AL 2,946,880
LUMINAIRE
Filed Aug. 31, 1954 6 Sheets-Sheet 1

WITNESSES:

INVENTORS
George J. Picha
and Frederic C. Winkler.
BY
ATTORNEY

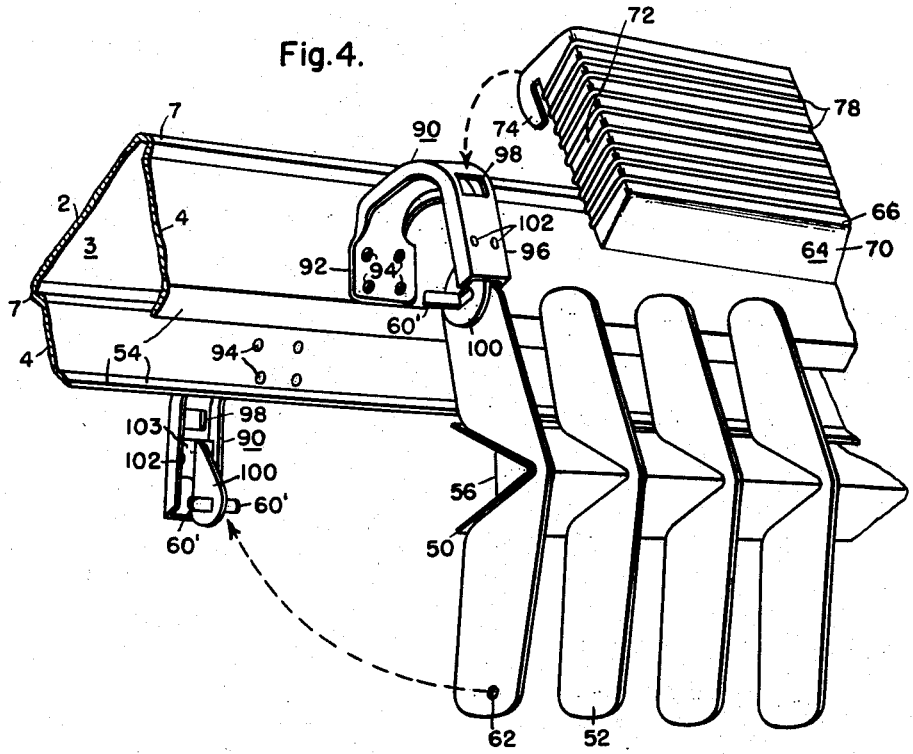
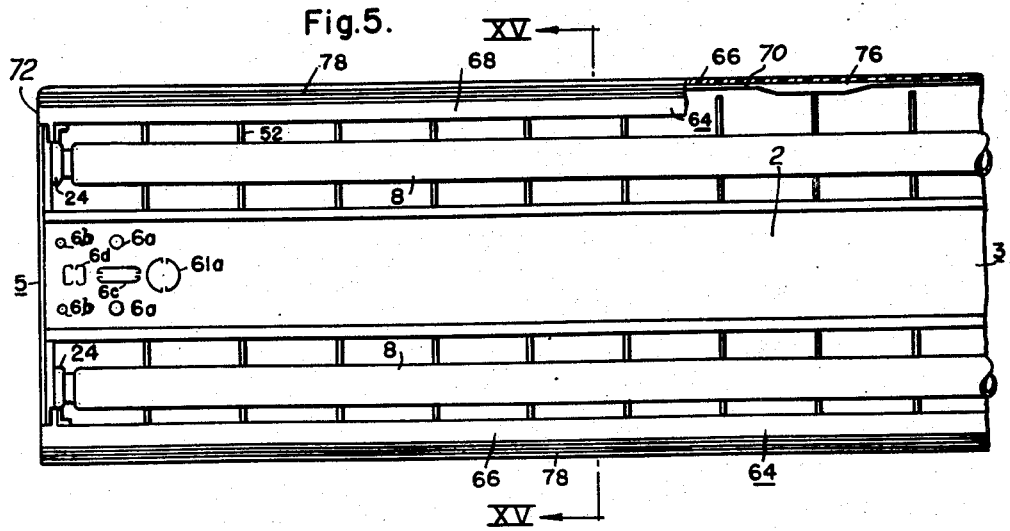

July 26, 1960 G. J. PICHA ET AL 2,946,880
LUMINAIRE
Filed Aug. 31, 1954 6 Sheets-Sheet 4
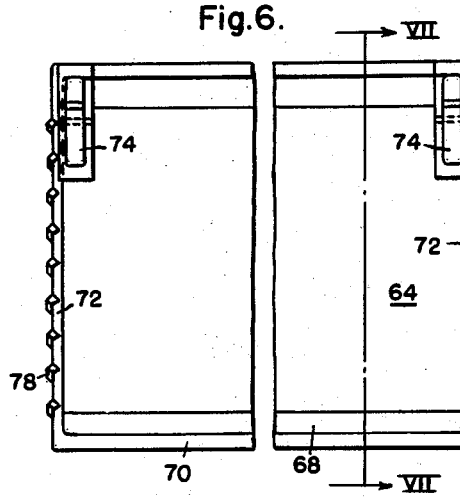
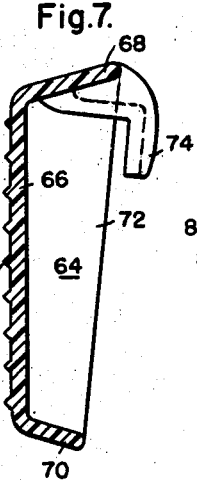
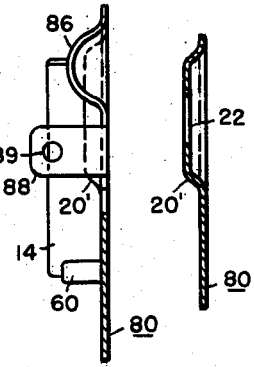
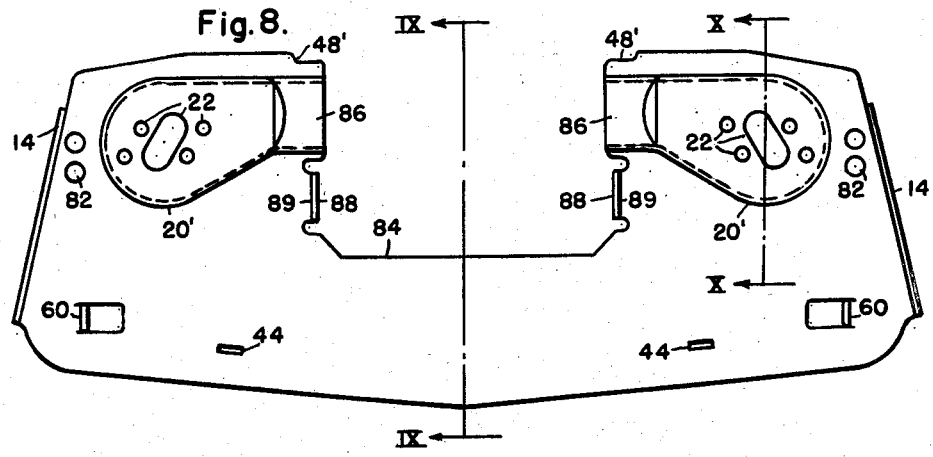
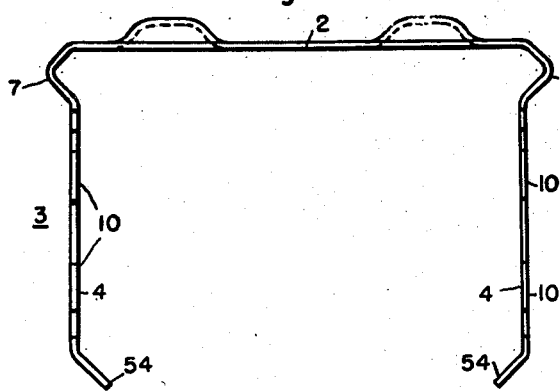
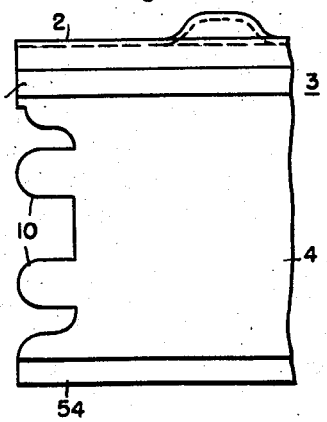

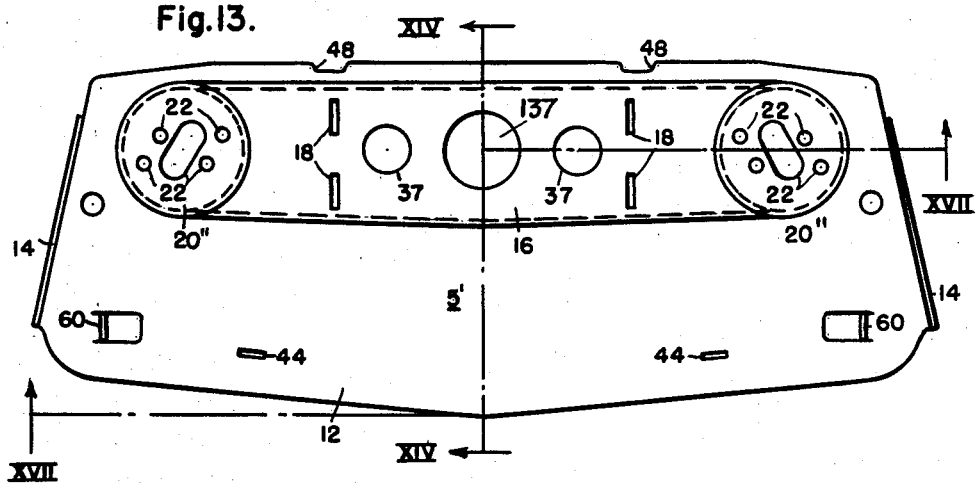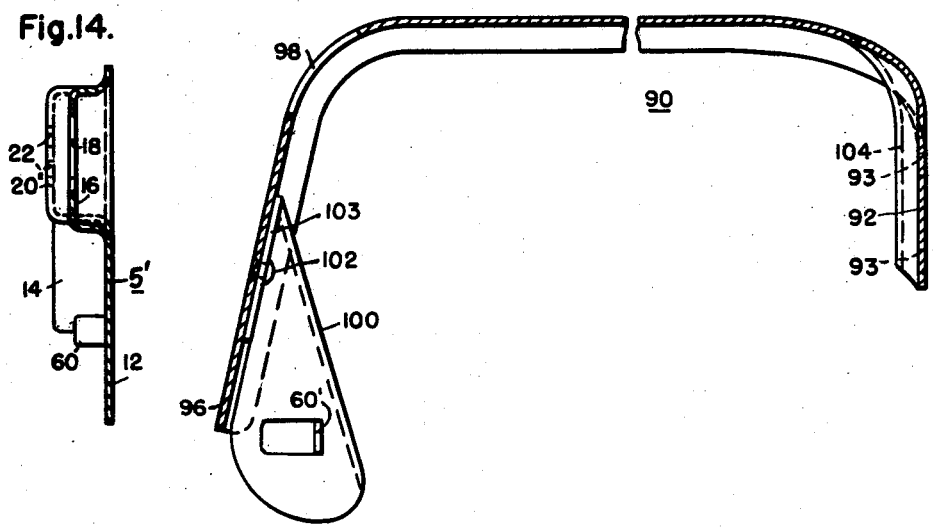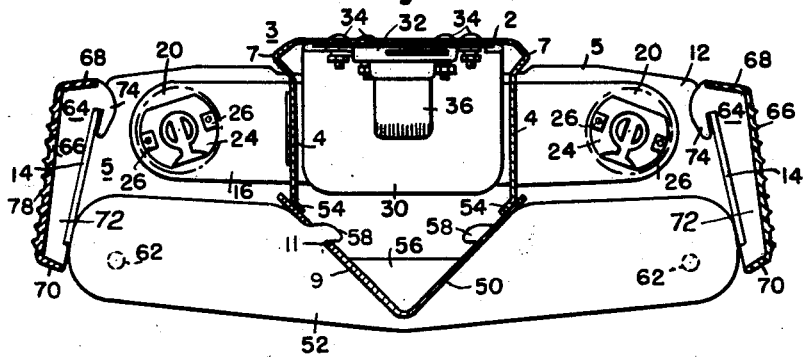

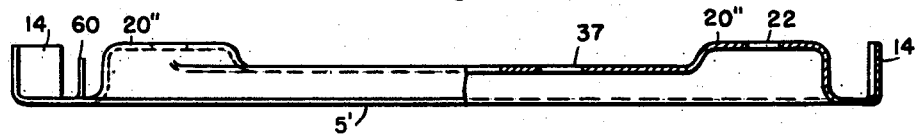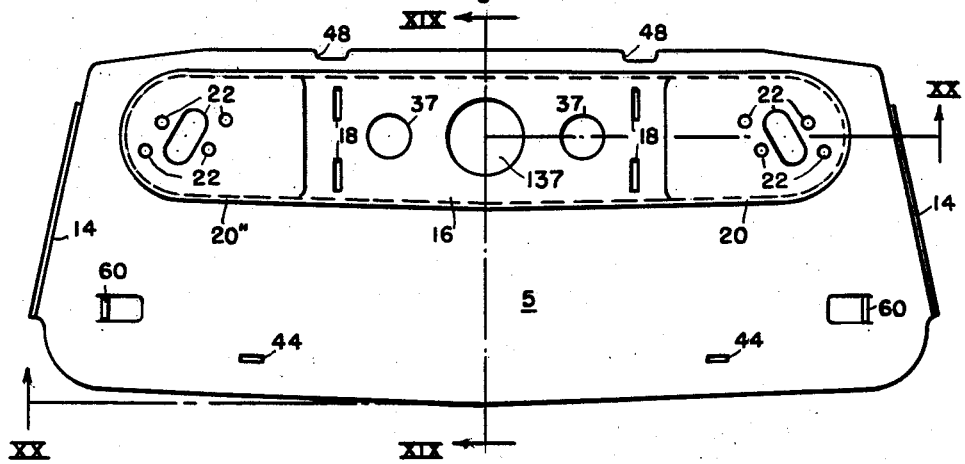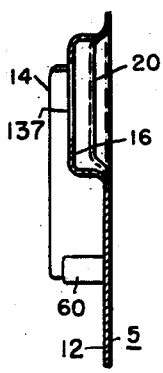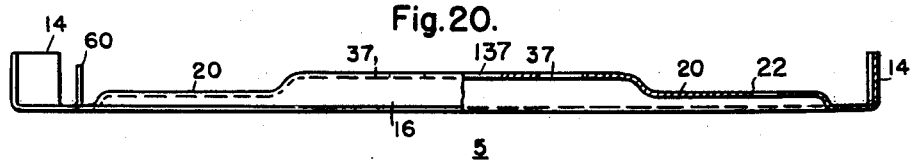

United States Patent Office 2,946,880
Patented July 26, 1960

2,946,880
LUMINAIRE

George J. Picha and Frederic C. Winkler, Cleveland, Ohio, assignors to Westinghouse Electric Corporation, East Pittsburgh, Pa., a corporation of Pennsylvania Filed Aug. 31, 1954, Ser. No. 453,184

10 Claims. (Cl. 240—51.11)

The invention relates to luminaires generally and more particularly to elongated luminaires which are adapted to be suspended or mounted directly upon an upper member or ceiling.

In selecting a luminaire for lighting purposes, there are obviously numerous considerations which determine the final selection. It is equally obvious that in most instances it is the overall basis rather than a particular feature alone which determines the selection of a particular luminaire. In view of these factors, we have designed a new and improved luminaire which may be produced at a lower cost than similar luminaires presently upon the market, which incorporates features which have been desired by the industry all without sacrificing lighting efficiency. Accordingly, broadly speaking, one object of our invention is to provide a new and improved luminaire.

Another object of our invention is to provide a new and improved luminaire which may be produced at a substantially lower cost than similar luminaires presently being marketed.

Another object of our invention is to provide a new and improved luminaire which may easily be installed in a variety of manners.

Still another object of our invention is to provide a new and improved luminaire which has interchangeable parts whereby a variety of arrangements may be made.

Another object of our invention is to provide a new and improved luminaire which may easily be maintained.

A more specific object of our invention is to provide a new and improved luminaire which has a pivotally supported louver assembly which may be easily removed to service the luminaire.

A further object of our invention is to provide a new and improved luminaire having an improved external appearance.

A more specific object of our invention is to provide a new and improved luminaire having a side panel with a luminous corner.

Yet another object of our invention is to provide a new and improved luminaire which may be fabricated to various desired lengths by utilizing a single set of forming tools.

Still another object of our invention is to provide a new and improved luminaire having component parts of improved simplified construction.

These and other objects of our invention will become more apparent when taken in conjunction with the following figures, in which:

Fig. 4 is an exploded perspective view of the luminaire, similar to Fig. 3, illustrating another type of center support therefor;

Fig. 5 is a top plan view of one end portion of a luminaire, as shown in Fig. 1;

Fig. 6 is a side elevational view of the side panel for the luminaire, as shown in Fig. 1;

Fig. 7 is a cross-sectional view of the side panel, shown in Fig. 6, taken substantially along the line VII—VII thereof;

Fig. 8 is a side elevational view of the center support for the luminaire, as shown in Fig. 3;

Fig. 9 is a cross-sectional view of the center support, as shown in Fig. 8, taken substantially along the line IX—IX thereof;

Fig. 10 is a cross-sectional view of the center support, shown in Fig. 8, taken substantially along the line X—X thereof;

Fig. 11 is an end elevational view of the supporting channel for the luminaire, as shown in Fig. 1;

Fig. 12 is a side elevational view of the supporting channel, as shown in Fig. 11;

Fig. 13 is a side elevational view of the inner side of one type of an end plate for the luminaire, similar to that shown in Fig. 2;

Fig. 14 is a cross-sectional view of the end plate, shown in Fig. 13, taken substantially along the line XIV—XIV thereof;

Fig. 15 is a cross-sectional view of an assembled luminaire, as shown in Fig. 5, taken substantially along the line XV—XV thereof with the lamps removed;

Fig. 16 is a longitudinal sectional view of a center support, as shown in Fig. 4;

Fig. 17 is a partial cross-sectional and partial bottom plan view of the end plate shown in Fig. 13, taken substantially along the line XVII—XVII thereof;

Fig. 18 is an elevational view of the inner side of the end plate for the luminaire as shown in Fig. 1;

Fig. 19 is a cross-sectional view of the end plate shown in Fig. 18 taken substantially along the line XIX—XIX thereof; and Fig. 20 is a partial cross-sectional and partial bottom plan view of the end plate shown in Fig. 18 taken substantially along the line XX—XX thereof.

One commonly employed method of arranging lighting equipment is to suspend the lighting fixture below the level of an interior ceiling in order to obtain the type and level of illumination desired. By so suspending the lighting fixture and by properly designing the lighting fixture, it is possible to obtain a combination of direct and indirect lighting where the major portion of the illumination produced on ordinary working plans is a result of the light coming directly from the luminaire. There is, however, a substantial portion of the light directed to the ceiling and side walls. Where the ceiling and side walls are light in color, the upward light provides a brighter background against which to view the luminaire in addition to supplying a substantial indirect component which adds materially to the diffused character of illumination. In such suspended lighting fixtures, it is common practice to support a channel member below the ceiling and to fasten the various electrical and structural parts to the channel.

Figure 2:
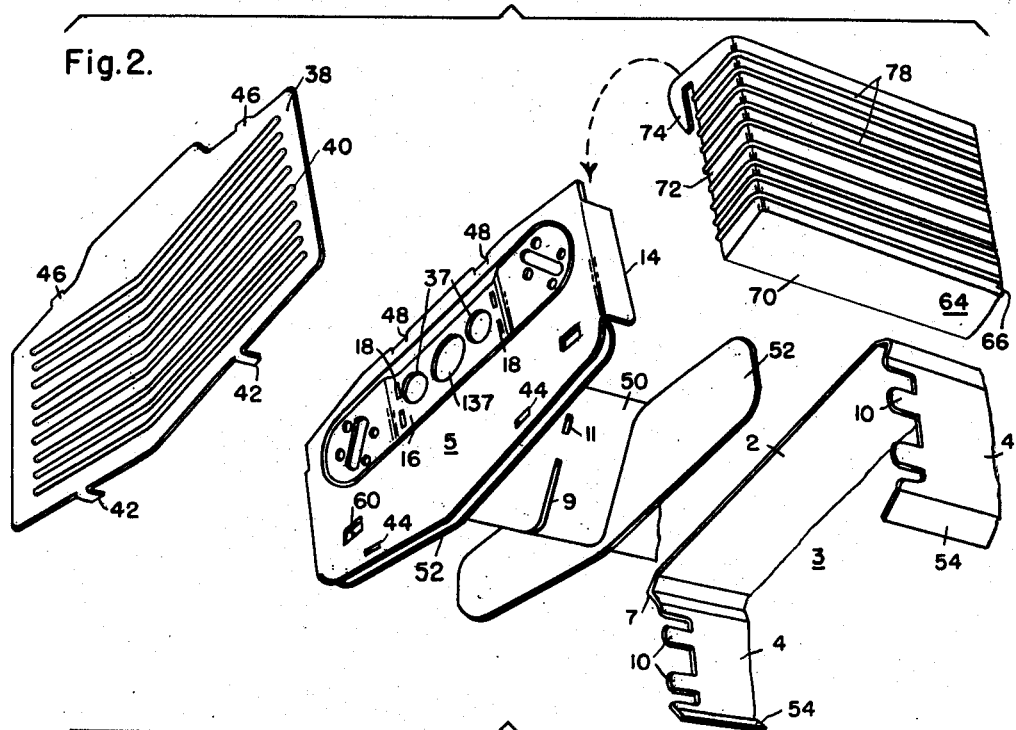
Fig. 2 is an exploded perspective view of the end portion of the luminaire shown in Fig. 1, illustrating the louver assembly, supporting channel, and side, in part, and an end plate and cover for the end of the luminaire.

Referring to Figs. 2, 4 and 15, it will be noted that a luminaire constructed in accordance with the principles of our invention utilizes a generally U-shaped supporting channel 3 having a bight portion 2 at each side of which are located integral downwardly extending side walls 4. Channel 3 may be fabricated from a wide variety of structural materials which have the requisite mechanical strength; however, in order to obtain rapid assembly features and lower cost, channel 3 is preferably fabricated from a light gauge material, such as steel, which is formed, as hereinafter explained, along its entire length to obtain additional rigidity. As shown in Fig. 5, the bight portion 2 of channel 3 is provided with various standard shaped knockouts 6a, 6b, 6c and 6d, some of which may be used for securing electrical conductors to the channel 3 in any of the desired standard manners, such as by electrical fittings, not shown. The other knockouts may be used to secure stem hangers to the channel 3. As more clearly shown in Figs. 11 and 12, each side wall 4 of channel 3 adjacent bight 2 is provided with outwardly extending approximately V-shaped beads 7 along the entire length of the channel 3, whereby the channel may be supported at any point along its length by means of slidable stem hangers, not shown, which extend around and grasp the beads 7. If desired, however, channel 3 may be directly secured to the ceiling by any suitable mechanical means, such as screws extending through the bight portion 2, and engaging suitable means in the upper ceiling. As various types of stem hangers and direct securing means are known in the art, such have not been shown, nor is it believed necessary to particularly describe their operation.

As has been indicated, one of the objects of our invention is to provide a luminaire which may be assembled in a variety of manners. In order, however, to facilitate the discussion of our luminaire, a two-lamp, four foot luminaire, as shown in the hereinafter identified figures, will initially be described. It will, of course, be realized that the nomenclature, four foot, is a nominal one used to designate the length of lamp supported within the luminaire and that the luminaire of necessity must be longer than the supported lamps.

Referring to Figs. 2 and 12, it will be noted that each end of each side wall 4 of channel 3 is notched at each of its ends to form a pair of recessed extending tabs 10. Once such a formed channel has properly been installed, formed end plates 5, as shown in Fig. 18, are secured to each end of the channel 3, as hereinafter described. End plates 5 may be made from any suitable material which has sufficient structural strength and preferably are formed from a light gauge sheet steel. End plates 5 comprise a flat plate portion 12 having inwardly extending vertically sloping tabs 14 at each of its sides and an inwardly facing longitudinally extending boss 16 located adjacent its upper edge. Boss 16 is provided with a pair of vertically spaced, vertically extending slots 18, each of which is equal distance from the vertical center line of the end plate 5. Slots 18 are laterally spaced a distance corresponding to the width of the side walls 4 of the channel 3 so that tabs 10 may extend through slots 18 when end plates 5 are placed upon each end of the channel 3. After being so inserted, tabs 10 are manually bent over the outwardly facing surface of the boss 16, whereby end plates 5 are secured to the channel 3. By this construction, tabs 10 are located within the boss 16 and are inwardly displaced from the outer surface of the end plate 5, whereby the tabs 10 will not interfere with locating the end cover, as hereinafter described, on the outer side of each end plate 5 whereby the gauge thickness of tabs 10 may be disregarded. As shown in Fig. 12, the notches in each end of channel 3 are provided with a contour to conform to the cross-section of boss 16, as shown in Fig. 19, whereby a tight fit is obtained between end plates 5 and channel 3. It will also be noted from Fig. 15 that the upper edge of each end plate 5 is displaced below the beads 7 in order that a sliding hanger may be freely slid over the end of the channel 3.

As also shown in Figs. 18, 19 and 20, each boss 16 is provided at each of its ends with an additional shallow boss 20 which extends inwardly towards channel 3 a lesser distance than boss 16. Bosses 20 are preferably oblong in form and are provided with a plurality of openings 22 which are located in order that any one of a variety of standard lamp holders, such as lamp holders 24, shown in Fig. 15, may be secured to each boss 20 in any suitable manner, such as by a machine screw and nut assembly 26. Thereafter, as shown in Fig. 5, a pair of discharge devices, such as fluorescent lamps 8, may be located between opposed pairs of lamp holders 24. Although only a two-lamp unit has been shown, it is believed obvious that additional bosses 20 may be provided adjacent the bosses 20, as shown, or bosses 20 may be enlarged in order to secure two lampholders 24 at each side of channel 3 in order to obtain a four-lamp unit.

Once end plates 5 have been attached, as indicated, to channel 3 in either a two or four-lamp unit, the luminaire is sufficiently assembled that it may be electrically wired. As shown, electrical control means, such as a ballast 30 (Fig. 15) and a lamp starter holder 32, may be secured to the bight 2 of channel 3 in any suitable manner, such as by machine screws 34. Such electrical control components may be installed either at the factory or in the field at either the floor or an elevated level. When such components are properly installed, the lamp holders 24, ballast 30 and lamp starter holder 32, may easily be wired together, and a lamp starter 36 installed in lamp starter holder 32. It is believed obvious that if lamps 8 are used which do not require a lamp starter, the lamp starter holder 32 may be eliminated. It is believed equally obvious that, if desired, all such wiring may be done at the floor level. It should be noted that the boss 16 in each end plate 5 is provided with a pair of laterally spaced openings 37 with a somewhat larger opening 137 therebetween between the side walls 4 of channel 3 in order that suitable electrical wires can be extended from the ballast 30 through openings 37 to the outwardly facing side of bosses 16 to the rear of lampholders 24. By this construction, such wires will be located within bosses 16 and secured to the underside of lampholders 24 in a manner so as not to interfere with locating the cover on end plates 5, as hereinafter described. Also, openings 37 may be utilized to permit bolting two luminaires against each other and opening 137 utilized for electrical wiring purposes. After channel 3 and end plates 5 have been assembled and properly supported, the remaining parts of the luminaire may easily be installed. Also, as will become apparent from the description hereinafter, it is equally easy to install the other parts of the luminaire at the floor level. In view of the ease with which they are installed, no particular problem is encountered in assembling the additional components when the luminaire is supported from the ceiling.

Referring to Fig. 2, it will be noted that an end cover 38 which may be fabricated from any suitable material, such as a light gauge of sheet steel, is provided to cover the outer sides of each end plate 5. If desired, an external design, such as ribs 40, may be provided in order to inexpensively obtain a more pleasing external appearance and to obtain additional stiffening of covers 38. Covers 38 are provided at their lower edges with a pair of laterally spaced, inwardly projecting tabs 42 which may be inserted in cooperating slots 44 provided in each end plate 5. Covers 38 are also provided with a pair of laterally spaced, inwardly projecting tabs 46 at their upper edges which engage spaced recesses 48 in each end plate 5. When so located, the tabs 42 and 46 are bent over the inner surface of plate 12 of end plates 5, whereby the covers 38 are securely fastened to the end plate 5. It will also be noted that covers 38 cover the outwardly facing portion of boss 16 so as to cover the wires which may be located therein.

Figure 1:
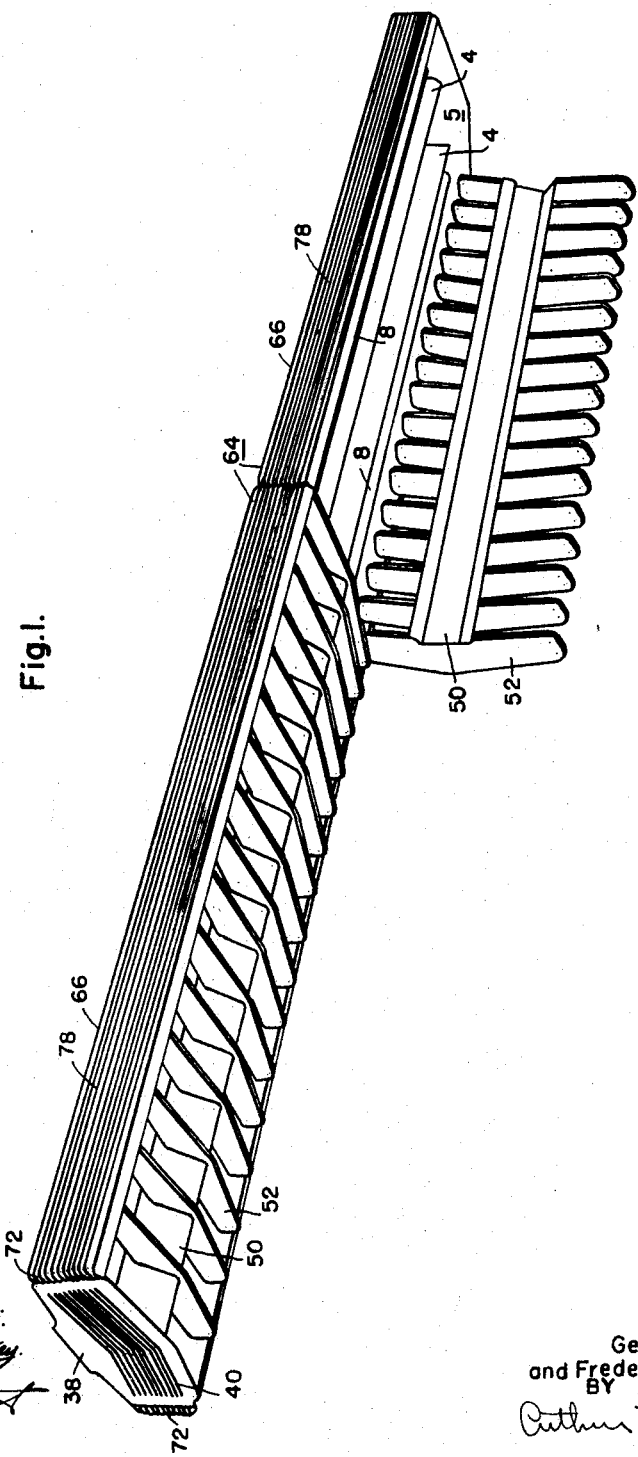
Figure 1 is a perspective view of a luminaire constructed in accordance with the principles of our invention having a double louver assembly, one of which is shown in the closed position, the other of which is shown in the open position.

As shown in Fig. 1, a louver assembly is provided beneath the lamps 8 in order to shield the lamps from view crosswise and endwise at various suitable angles. It will also be noted that the louver assembly comprises a center channel 50 (Figs. 1 and 3) which may be made from any suitable material having the requisite mechanical strength, such as light gauge sheet steel, to which are secured a plurality of transversely extending louver blades 52. As more clearly shown in Fig. 15, the channel 50 is approximately V-shaped and engages inwardly sloping flanges 54 at the lower edge of each side wall 4 of channel 3, so that the channel 50 covers the underside of the channel 3.

The entire louver assembly is designed so that the blades 52 may easily be inserted within the channel 50. As shown in Figs. 2 and 15, channel 50 is provided with a plurality of transversely disposed spaced slots 9 in which the center portion 56 of the blades 52 are located. Immediately above each end of the slot 9 in each side of channel 50, there is provided a smaller slot 11. Blades 52 are provided with cooperating inwardly projecting tabs 58 which engage the slots 11 whereby blades 52 may easily be assembled to the channel 50. Such assembly is accomplished by placing the channel 50 so that its two outer edges are compressed slightly together, and thereafter placing one tab 58 in a corresponding slot 11 in the channel 50, rotating the blade 52 around the one tab 58 so that the center portion 56 enters the center slot 9 in channel 50. After all of the blades 52 have been thusly positioned, channel 50 is released so that the other tab 58 enters the additional slot 11 on the other side of channel 50. If desired, thereafter each tab 58 may be welded to the channel 50 in order to obtain a more rigid construction. Blades 52 may be formed from any suitable material, but for the purposes of our invention, a light gauge steel which is highly flexible and somewhat resilient is desirable, as will become more apparent as this description proceeds.

Figure 3:
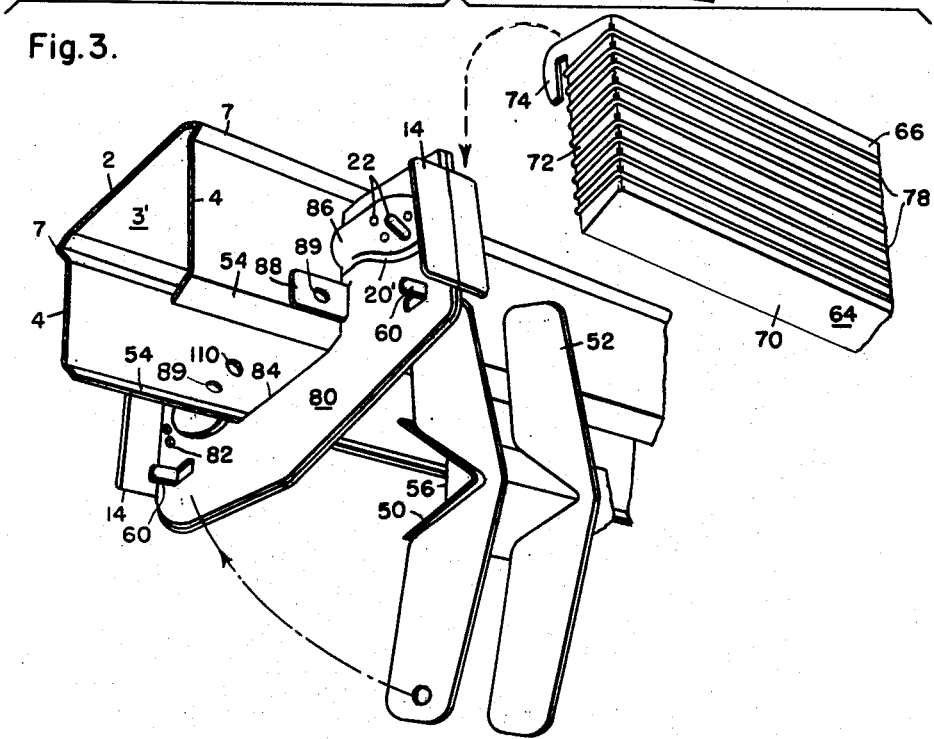
Fig. 3 is an exploded perspective view of the central portion of the luminaire shown in Fig. 1, illustrating, in part, a supporting channel, louver assembly and side, and showing one type of center support attached to the supporting channel.

Referring again to Fig. 18, it will be noted that the end plate 5 is provided adjacent its lower edge and adjacent each of its sides with an inwardly projecting tab 60, which may easily be formed by punching end plate 5. As shown in Figs. 3 and 4, each end blade 52 of the louver assembly is provided with an opening 62 adjacent each of its ends and its lower edge which are cooperable with the tabs 60 on end plate 5 to support the louver assembly. Thus, the louver assembly may easily be installed between two end plates 5 by merely flexing corresponding ends of the outermost end blades 52 inwardly so that openings 62 clear therein the tabs 60 at one side of the channel 3. Thereafter, the opposed ends of end blade 52 are released so that tabs 60 enter and engage openings 62. The louver assembly is then rotated around these support tabs 60 and the other end of each end blade 52 is flexed inwardly so that the other openings 62 clear the other tabs 60 at the other side of end plate 5 in a manner similar to that previously discussed. It is equally easy to remove the louver assembly from the end plates 5 for any purposes, such as replacing of lamps 8 or for cleaning the louver assembly. As has been indicated, inwardly and downwardly sloping flanges 54 are provided at the lower edges of each side wall 4 of the channel 3 which are located to engage the upper inner surface of each side of the V-shaped channel 50, whereby each side of channel 50 is supported along its entire length. By so supporting channel 50, a light gauge steel may be used and still retain sufficient rigidity in the louver assembly. If desired, for purposes such as cleaning the luminaire assemblies, the luminaire assemblies may easily be removed in the reverse manner from that previously described. In most maintenance work, it is desirable that the louver assembly may readily be located so as not to interfere with the work and without requiring that additional labor be required in carrying or lowering the louver assembly out of the working area. It will be noted that by our construction it is not necessary to remove the louver assembly from the channel 3, but that it may be removed from only one pair of tabs 60 and swung downwardly so that it is pivotally supported by the other pair of tabs 60. As the louver assembly is identical on each side, the louver assembly may be pivotally supported at either of its sides. When the louver assembly is so positioned, it is clear of the channel 3 and the various electrical components including the lamps 8 may easily be serviced or replaced.

A further feature of our invention is in the new type of side panel 64 as shown in Figs. 6 and 7, and its particular cooperation with the flanges 14 of the end plates 5. Panels 64 may be formed from any suitable material having the requisite mechanical strength such as steel or, as shown, a plastic material, which, if desired, may be translucent. Panels 64 have an elongated rectangular dished shape and are of a length so as to extend between tabs 14 on end plates 5 at each end on one side of a luminaire. As shown, panels 64 comprise an upwardly extending side wall 66 having an inwardly and upwardly extending top wall 68 at its upper edge and an inwardly and downwardly extending bottom wall 70 at its lower edge. Side wall 66, top wall 68, bottom wall 70 are joined together at each of their ends by means of integral end walls 72 whereby a unitary structure is obtained. It will be noted that top wall 68 is slightly longer than bottom wall 70 so that when end walls 72 of panels 64 are placed flush against the outer surface of longitudinally spaced flanges 14, the slope of flanges 14 is compensated for and the side wall 66 is approximately parallel to the side wall 4 of channel 3. It is obvious that the relative position of side walls 66 with reference to side walls 4 of channel 3 may be varied by changing the length and location of top wall 68 and bottom wall 70. In order to support panels 64 from flanges 14, each panel 64 is provided with relatively heavy inwardly extending hooks 74 which may be either integral with panel 64, as shown, or formed as a separate part attached thereto in any suitable manner.

As illustrated in Fig. 2, panel 64 may easily be supported by the flanges 14 by merely elevating the panel 64 above the longitudinally spaced flanges 14 and lowering the panel 64 so that the longitudinally spaced hooks 74 engage the upper edges of flanges 14, respectively. As shown in Fig. 15, each hook 74 is located inwardly of the inner surface of flanges 14 whereby the panel 64 cannot be removed from the flanges 14 without being elevated so that the hook 74 clears the flanges 14. As shown in Fig. 15, panel 64 is supported in its proper position by the engagement of the inner edges of end walls 72 with the outer surface of flanges 14. By so locating side walls 66 outwardly from flanges 14, it will be apparent that if a translucent material is used for panel 64 a luminous corner will be obtained. Such a feature provides a substantial advantage with relation to long lines of luminaires, in that no dark areas are located between adjacent side panels. It will further be noted that as flange 14 extends inwardly from the inner surface of end plate 5 to form an opaque corner that objectionable leakage of high intensity light at the ends of panel 64 and the end plate 5 is prevented. Also, as shown in Fig. 5, bottom wall 70 of each side panel 64 may be provided with an integral offset 76 which extends inwardly so as to transversely engage the outer edge of at least one blade 52 thereby supporting the lower edge 70 of panels 64 along their length. Also, if desired, panels 64 may be provided with ridges 78 on either or both side walls 66 and end walls 72 for obtaining a more diffused lighting distribution or for esthetic purposes.

Thus, it will be noted that we have provided a new and improved luminaire composed of parts which may be easily assembled. Also due to the location of the various parts as described, a compact shallow assembly is obtained which is light in weight and which requires little overhead space. Also, our luminaire may easily be serviced for any purpose. As has been indicated, the luminaires constructed in accordance with the principles of our invention may be installed in a variety of manners. One modification may comprise using two four-foot units as previously discussed, arranged in tandem as shown in Fig. 1. In order, however, to eliminate a duplication of end plates where two of such four-foot units are joined, we have provided the single center support 80 shown in Fig. 8 for use in the manner shown in Fig. 3. With reference to Fig. 3, it will be noted that the channel 3' is utilized which extends the entire length of such a tandem unit and which is identical in all other details of construction to the channel 3 previously described.

Referring to Figs. 3, 8, 9 and 10, it will be noted that the center support 80 is formed to the same general outer contour as end plate 5, being provided with flanges 14 and tabs 60 identical to those previously described on end plate 5. It should also be noted that center support 80 may be provided with slots 44 and upper recesses 48' which in effect constitute a portion of the upper recesses 48 in plate 5 in order to utilize the same forming tools as are utilized for plate 5. Although the slots 44 and recess 48' are not utilized, slots 44 and recesses 48' on the center support 80 may therefore be eliminated. In view of these identical components and sizes, it is obvious that the same metal blank may be used to form center support 80 as utilized to form end plate 5. Inasmuch as two center supports 80 are required in back-to-back relationship, as will become more apparent as this description proceeds, each center support 80 is provided with a pair of openings 82 at each of its sides adjacent the upper end of flange 14 whereby suitable securing means, such as a machine screw and nut assembly (not shown), may be inserted therethrough to secure the two plates together back-to-back.

In a manner somewhat similar to that in which end plate 5 is formed, center support 80 is provided with a pair of spaced inwardly facing bosses 20' adjacent its upper edge at each of its sides having openings 22 therein whereby suitable lampholding means may be secured to center support 80 in the manner previously described. As indicated, channel 3' extends the entire length of such a tandem unit and accordingly, center support 80 is provided with an upper central recess 84 whereby the center support 80 may be applied from beneath the channel 3' so that bosses 20' are located adjacent the outer surface of each of the side walls 4 of channel 3'. In order that wiring connections may easily be made to lampholders 24 when secured to bosses 20'; in the manner similar to that previously described, support 80 is provided with a pair of longitudinally extending bosses 86 which connect each boss 20' with the recess 84. Side walls 4 of channel 3' are provided with openings 110 whereby wiring conductors may be inserted within the bosses 86. Center support 80 is further provided with a pair of inwardly projecting tabs 88 along the edges of recess 84 below bosses 86 in order that the center support 80 may be secured to the channel 3' in any suitable manner such as by sheet metal screws extending through openings 89 therein for engaging openings in the side walls 4 of channel 2'.

Referring to Fig. 3, wherein a pair of center supports 80 are shown assembled together, it is apparent that, inasmuch as flanges 14, tabs 60 and openings 22 are all identical to those previously discussed and are located in the identical manner, a pair of panels 64 may be supported in tandem on each side of such a luminaire between a flange 14 on an end plate 5 and a flange 14 on a center support 80. Likewise, a pair of louver assemblies can be arranged in tandem between the tabs 60 on a center support 80 and an end plate 5 in the identical manner as previously discussed. It is also obvious that the lamps and wiring may be installed and serviced in the identical manner as previously discussed. Also, it is believed obvious that by such construction a line of four-foot units incorporating as many individual units as desired could be obtained by providing a series of channels 3 and/or 3' or a channel of a longer length similar to channel 3' on which a series of center supports 80 are located.

A still further modification of our invention somewhat similar to the tandem unit previously described, comprises utilizing a nominal eight-foot discharge device such as the present day commercial eight-foot fluorescent lamps. In order to utilize a pair of panels 64 arranged in tandem for such a unit the supporting channel is identical to the supporting channel 3' previously discussed. With such a unit the center supports 80 could be provided with an additional opening in the area through which such a tube would extend whereby each end of the tube would be secured to a lampholder 24 located on an end plate 5. Such a construction would entail providing spacers on end plates 5 whereby the spacing of lampholders 24 would be decreased due to the fact that a pair of lampholders 24 and a pair of bosses 20' have been eliminated at the center of the luminaire. In order to eliminate the necessity of such spacers to foreshorten the distance between opposed lampholders 24, an end plate 5' shown on Figs. 13, 14 and 17 has been designed which is identical to the end plate 5 previously discussed in all aspects except that a deep boss 20'' is provided in place of the shallow boss 20. Such deep boss 20'' compensates for the removal of the central lampholders 24 and the center supports 80. The difference in depth between bosses 20 and 20'' is best illustrated by comparison of Figs. 17 and 20. It is believed obvious that with this construction the assembly of the side panels 64 and the louver assembly would be identical to that previously described. It is also believed obvious that eight-foot units could be arranged in tandem by utilizing the center supports 80 in the same manner the center supports 80 were utilized in obtaining four-foot units in tandem.

Although, as indicated, two center supports 80 could be modified for use with an eight-foot discharge device, such a modification is not entirely satisfactory as a solid plate would be located below the discharge device in a light emitting area. Accordingly, another modification for such an eight-foot unit comprises a center support 90 as shown in Fig. 16 for supporting side panels 64 in tandem relationship at their meeting plane. Referring also to Fig. 4, it will be noted that support 90 is an approximately U-shaped channel having a downwardly extending inner arm 92 which is flattened at its outer edge whereby it may be mounted flush against a side wall 4 of channel 3'. This flattened portion of arm 92 is provided with a plurality of openings 93 whereby support 90 may be secured to the side walls 4 of channel 3' in any suitable manner, such as by sheet metal screws 94 passing through these openings engaging openings in the side wall 4. The other downwardly extending arm 96 of support 90 is provided with an opening 98 adjacent its bight portion of support 90 for receiving the hooks 74 of side panels 64. Hooks 74 of side panels 64 are inserted within openings 98 of support 90 and engage support 90 in the identical manner as has been discussed with relation to flanges 14. Below opening 98, arm 96 is provided with a louver support 100 which comprises a plate 103 secured to the arm 96 by any suitable means such as rivets 102. Support 100 also comprises an integral extending plate from plate 103 which is approximately tear-shaped and is provided with a pair of opposed extending tabs 60' which are identical to the tabs 60 previously discussed and for the same purpose. Thereafter, the meeting edges of two louver assemblies may be secured to the opposed projections 60' in the same manner as projections 60 previously discussed.

Thus, it will be noted that we have designed a unit which is capable of being mounted in a wide variety of patterns including, if desired, an arrangement of eight and four-foot units. Also, these units are all fabricated from relatively light gauge material whereby the initial cost is reduced. Further, even though longer units are employed, many of the same component parts are utilized whereby the initial cost is further reduced due to the elimination of additional stock items.

Although we have shown and described various modifications of our invention in accordance with the patent statutes, we are aware that other modifications thereof are possible without departing from the broad spirit and scope of our invention. Accordingly, it is desired that our invention be not restricted except insofar as is necessitated by the prior art and the spirit of our invention.

We claim as our invention:

1. An elongated luminaire comprising a main supporting longitudinally extending channel having downwardly extending side walls, a plate at each end of said channel extending transversely to and outwardly beyond each of said side walls, each of said plates having a lateral boss therein which extends outwardly beyond each of said side walls, each of said side walls being formed with a recess for receiving said boss therein so that the ends of said side walls are approximately flush with the inner surface of said plate at the base of said boss, each of said side walls being provided in said recess with extending projections insertable through openings in said boss for securing said plates to each side wall by bending said projection to engage the outer surface of said boss, and lamp supporting means secured to each of said bosses adjacent each of said side walls for receiving a lamp therebetween.

2. An elongated luminaire comprising a main supporting longitudinally extending channel having downwardly extending side walls, a covering plate secured to each end of said channel extending transversely thereto and outwardly beyond each of said side walls, a pair of supports secured at substantially the midpoint of said channel to the side walls thereof, respectively, extending transversely outwardly, each of said plates having a flange extending transversely thereto at each of its free ends inwardly so as to form a pair of opposed flanges at each side of said channel, each of said supports having a downwardly extending arm having a surface in substantially the same plane as said opposed flanges, each of said surfaces being provided with an opening having a bottom edge in substantially the same line as the upper edge of said opposed flanges, a plurality of side panels each having a hook portion at each of its ends adapted to engage said upper edge of one of said flanges and said bottom edge of said opening, respectively, and lamp supporting means secured to each of said plates for supporting lamp means therebetween.

3. An elongated luminaire comprising a main supporting longitudinally extending channel having downwardly extending side walls, a covering plate secured to each end of said channel and extending transversely thereto and outwardly beyond each of said side walls, a pair of supports secured at substantially the midpoint of said channel and extending transversely outwardly thereof, each of said covering plates having a first flange extending transversely thereto at each of its free ends inwardly along said channel so as to form a pair of opposed first flanges at each side of said channel, each of said supports having a downwardly extending arm having a surface in substantially the same plane as said opposed first flanges, each of said surfaces being provided with an opening having a bottom in substantially the same line as the upper edges of said opposed first flanges, a side panel formed from a light transmitting material comprising an elongated section having transversely extending second flanges at each of its ends each extending in the same direction, means at each end of said side panel engageable with said first flange and said bottom of said opening to support the side panel therebetween, and lamp supporting means secured to each of said plates for supporting lamp means therebetween.

4. An elongated luminaire comprising a plurality of longitudinally extending main supporting channels located in tandem so as to form a row thereof, a covering plate extending transversely to said channels at each end of said row, a plurality of intermediate supports at each side of said channels extending transversely thereto and located between said covering plates, lamp supporting means secured to said covering plates and at least one of said intermediate supports at each side of said channels for supporting an elongated lamp therebetween, a plurality of side members formed from a light transmitting material comprising at least an elongated section having integral flanges inwardly extending at each of its ends, both of said flanges extending in the same one direction relative to said section, mounting means on each of said flanges spaced further from said section in the same one direction so as to be spaced from said flanges, said side members extending between adjacent intermediate supports and said covering plates at each side of said channels so as to form a continuous row of side members at each side of said channels, and means on said covering plates and said intermediate supports engageable with the mounting means on said side members to so support said side members, said flange of said side panel forming a corner which transmits light, whereby translucent side panels placed adjacent to each other appear to form one continuous translucent panel.

5. An elongated luminaire comprising a main supporting longitudinally extending channel having downwardly extending side walls, a covering plate extending transversely across the space between said side walls at each end of said channel and outwardly beyond each side wall, means for securing said covering plates to said channel, lamp supporting means secured to the inner sides of the portions of said covering plates located outwardly of said side walls for receiving at least one lamp therebetween a louver located below said lamp supporting means and channel and including transversely extending free end louver blades with the blades at the longitudinal ends of said louver having flexible end portions, apertures and interengaging pivot projections on said louver blades and the portions of said covering plates located beyond said side walls, respectively, said louver releasably pivotally supported on one longitudinal side at the lower portion of said covering plates where it may be easily disengaged from the luminaire.

6. An elongated luminaire comprising a main supporting longitudinally extending channel having downwardly extending side walls, a plate at each end of said channel extending transversely to and outwardly beyond each of said side walls, each of said plates having a lateral boss therein which extends outwardly beyond each of said side walls, each of said side walls being formed with a recess for receiving said boss therein so that the ends of said side walls are approximately flush with the inner surface of said plate at the base of said boss, and lamp supporting means secured to each of said bosses adjacent each of said side walls for receiving a lamp therebetween.

7. An elongated luminaire comprising a main supporting longitudinally extending channel having downwardly extending side walls, a plate at each end of said channel extending transversely to and outwardly beyond each of said side walls, each of said plates having a lateral boss therein which extends outwardly beyond each of said side walls, each of said side walls being formed with a recess for receiving said boss therein so that the ends of said side walls are approximately flush with the inner surface of said plate at the base of said boss, transverse supporting plates mounted intermediate the ends of said channel and having portions extending outwardly at each side of the channel which also have bosses thereon, and lamp supporting means secured to each of said bosses adjacent each of said side walls for receiving a lamp therebetween.

8. An elongated luminaire comprising a main supporting longitudinally extending channel having downwardly extending side walls, a plate secured to each end of said channel extending transversely to and outwardly beyond each of said side walls, each of said plates having inwardly extending flanges at each of its sides, all of said flanges being spaced outwardly from said side walls and extending downwardly, an elongated panel of translucent material mounted on each side of said luminaire, each of said panels having integral inwardly extending end flanges having their outer ends engaging the outer surfaces of said end plate flanges, respectively, at one side of the luminaire, and hook means at the upper edge of each inwardly extending end flange at opposite ends of each panel to support the panel from the upper edge of said end plate flanges at the aforesaid position, and lamp supporting means on said plates for supporting an elongated lamp therebetween, said translucent flange and side panel forming a corner which transmits light, whereby the translucent elongated panel transmits light in the longitudinal direction.

9. An elongated luminaire including spaced end members having lampholders mounted on inner sides thereof in opposite relation for supporting at least one elongated lamp therebetween, a shielding device having blade cross members adapted to be located beneath said lampholders, interengaging pivot projections and apertures on the lower portion of said end members and on the remote blade cross members of said shielding device, respectively, at each side of said luminaire for pivotally supporting said shielding device at each side of said luminaire, and one of said interengaging elements being an aperture located in a remote blade cross member which is yieldable longitudinally of the luminaire so that each of the pivotal supports may be released or re-engaged.

10. An elongated luminaire comprising a plurality of longitudinally extending main supporting channels located in tandem so as to form a row thereof, a covering plate extending transversely to said channels at each end of said row, a plurality of intermediate supports at each side of said channels extending transversely thereto and located between said covering plates, lamp supporting means secured to said covering plates and at least one of said intermediate supports at each side of said channels for supporting an elongated lamp therebetween, a plurality of side members formed from a light transmitting material comprising at least an elongated section having integral flanges inwardly extending at each of its ends, both of said flanges extending in the same one direction relative to said section, mounting means on each of said flanges spaced further from said section in the same one direction so as to be spaced from said flanges, said side members extending between adjacent intermediate supports and said covering plates at each side of said channels so as to form a continuous row of side members at each side of said panels, each end of each of said covering plates having means for engaging one of said mounting means on one of said side members, and each of said intermediate supports having means for engaging one of said mounting means on two of said side members, said flange of said side panel forming a corner which transmits light, whereby translucent side panels placed adjacent to each other appear to form one continuous translucent panel.

References Cited in the file of this patent
UNITED STATES PATENTS

| | | |
|---|---|---|
| 2,320,829 | Naysmith | June 1, 1943 |
| 2,336,414 | Mitchell | Dec. 7, 1943 |
| 2,337,794 | Arenberg | Dec. 28, 1943 |
| 2,474,327 | Rolph | June 28, 1949 |
| 2,490,191 | Baker | Dec. 6, 1949 |
| 2,565,741 | Runge | Aug. 28, 1951 |
| 2,566,845 | Levaur et al. | Sept. 4, 1951 |
| 2,567,014 | Fine et al. | Sept. 4, 1951 |
| 2,579,015 | Schoenbrod | Dec. 18, 1951 |
| 2,663,794 | Arenberg | Dec. 22, 1953 |
| 2,724,047 | Zurawski | Nov. 15, 1955 |